(12) United States Patent
Modi et al.

(10) Patent No.: US 12,271,902 B2
(45) Date of Patent: Apr. 8, 2025

(54) NON-NATIVE ACCOUNT PROCESSING

(71) Applicant: Visa International Service Association, San Francisco, CA (US)

(72) Inventors: Vikram Modi, Lafayette, CA (US); Sunil Joshi, Santa Clara, CA (US); Shantnu Singh, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 185 days.

(21) Appl. No.: 17/631,796

(22) PCT Filed: Aug. 3, 2020

(86) PCT No.: PCT/US2020/044776
§ 371 (c)(1),
(2) Date: Jan. 31, 2022

(87) PCT Pub. No.: WO2021/026086
PCT Pub. Date: Feb. 11, 2021

(65) Prior Publication Data
US 2022/0270095 A1 Aug. 25, 2022

Related U.S. Application Data

(60) Provisional application No. 62/882,377, filed on Aug. 2, 2019.

(51) Int. Cl.
*G06Q 20/40* (2012.01)
*G06Q 20/10* (2012.01)
*G06Q 20/38* (2012.01)

(52) U.S. Cl.
CPC ....... *G06Q 20/4014* (2013.01); *G06Q 20/102* (2013.01); *G06Q 20/382* (2013.01); *G06Q 20/405* (2013.01)

(58) Field of Classification Search
CPC ...... G06Q 20/385; G06Q 20/36; G06Q 20/28; G06F 21/6245; H04L 67/51
See application file for complete search history.

(56) References Cited

U.S. PATENT DOCUMENTS

2006/0064372 A1* 3/2006 Gupta .................. G06Q 20/405
705/39
2013/0060690 A1 3/2013 Oskolkov et al.
(Continued)

FOREIGN PATENT DOCUMENTS

KR 100808788 B1 3/2009
WO 2015013548 1/2015

OTHER PUBLICATIONS

Application No. PCT/US2020/044776, International Search Report and Written Opinion, Mailed on Nov. 13, 2020, 15 pages.
(Continued)

*Primary Examiner* — Saba Dagnew
(74) *Attorney, Agent, or Firm* — Kilpatrick Townsend & Stockton LLP

(57) ABSTRACT

A technique for enabling non-native accounts to be processed by a processing system may include receiving an account identifier scheme that is used by a third-party entity to provide access to accounts associated with the third-party entity, and assigning an entity identifier to the third-party entity in which the entity identifier conforms to a native format used by the processing system. An application programming interface can be modified to recognize account identifiers of the third-party entity. A transaction request can be received to execute a transaction in which the transaction request includes a resource provider identifier of the third-party entity and an account identifier of an account of the third-party entity. The entity identifier assigned to the third-party entity can be determined using the modified applica-
(Continued)

tion programming interface, and the transaction can be processed using the entity identifier assigned to the third-party entity.

20 Claims, 6 Drawing Sheets

(56) References Cited

U.S. PATENT DOCUMENTS

| | | | |
|---|---|---|---|
| 2014/0020046 A1* | 1/2014 | Heitzman | G06F 21/56 |
| | | | 726/1 |
| 2014/0244500 A1 | 8/2014 | Elias | |
| 2014/0249999 A1 | 9/2014 | Johnson et al. | |
| 2015/0032625 A1* | 1/2015 | Dill | G06Q 20/4016 |
| | | | 705/44 |
| 2017/0019487 A1* | 1/2017 | Maheshwari | H04L 67/51 |
| 2017/0300903 A1 | 10/2017 | Mori et al. | |
| 2017/0324586 A1 | 11/2017 | Kim et al. | |
| 2017/0372301 A1* | 12/2017 | Theurer | G06Q 20/36 |
| 2018/0267847 A1* | 9/2018 | Smith | H04L 67/125 |
| 2018/0285982 A1* | 10/2018 | Pai | G06Q 40/12 |
| 2019/0295054 A1* | 9/2019 | Purves | G06Q 20/28 |
| 2023/0252187 A1* | 8/2023 | Fakhraie | G06F 21/6245 |
| | | | 705/50 |

OTHER PUBLICATIONS

Application No. SG11202200695W, Written Opinion, Mailed on Sep. 12, 2024, 6 pages.

* cited by examiner

| ACCOUNT TYPE 302 | RECIPIENT COUNTRY 304 | RESOURCE PROVIDER ID 306 | ACCOUNT RANGE 308 | ENTITY ID 310 | TRANSACTION PARAMETERS 312 |
|---|---|---|---|---|---|
| WALLET | CN | ALIPAY | N/A | 401218 | BC=RMB; SC=RMB; DOM=Y; XB=Y; FX=V; PP=Y; FF=N; VEL=10; MAX=50000 |
| WALLET | IN | PAYTM | N/A | 401214 | BC=INR; SC=INR; DOM=Y; XB=N; FX=P; PP=Y; FF=Y; VEL=20; MAX=50000 |
| BANK | JP | RAKTJPJT | N/A | 454200 | BC=JPY; SC=JPY; DOM=Y; XB=Y; FX=P; PP=Y; FF=Y; VEL=20; MAX=1000000 |
| BANK | UK | BUKBGB22 | N/A | 486483 | BC=GBP; SC=GBP; DOM=Y; XB=Y; FX=V; PP=Y; FF=Y; VEL=30; MAX=7500 |
| BANK | CH | 026007993 | 02300000 – 02319999 | 490001 | BC=USD; SC=CHF; DOM=Y; XB=Y; FX=P; PP=Y; FF=Y; VEL=25; MAX=20000 |
| BANK | CH | 026007993 | 02320000 – 02349999 | 490002 | BC=USD; SC=USD; DOM=N; XB=Y; FX=P; PP=Y; FF=Y; VEL=50; MAX=10000 |

FIG. 3

NON-NATIVE ACCOUNT PROCESSING

CROSS REFERENCE TO RELATED APPLICATIONS

This application is a 371 application of International Patent Application Number PCT/US2020/044776, filed Aug. 3, 2020, which claims the benefit of priority to U.S. provisional application No. 62/882,377 filed on Aug. 2, 2019, which are herein incorporated by reference in their entirety.

BACKGROUND

A processing system that processes and routes transactions typically requires the entities transacting to have accounts established with the processing system. However, this requirement results in a closed system in which only entities subscribing to the processing system's account infrastructure can utilize the services provided by the processing system. This creates a roadblock for interoperability of different processing systems, and prevents accounts if different processing systems from interacting with each other.

Embodiments of the invention address these and other problems, individually and collectively.

SUMMARY

A technique for enabling non-native accounts to be processed by a processing system may include receiving an account identifier scheme that is used by a third-party entity to provide access to accounts associated with the third-party entity, and assigning an entity identifier to the third-party entity in which the entity identifier conforms to a native format used by the processing system. An application programming interface can be modified to recognize account identifiers of the third-party entity. A transaction request can be received to execute a transaction in which the transaction request includes a resource provider identifier of the third-party entity and an account identifier of an account of the third-party entity. The entity identifier assigned to the third-party entity can be determined using the modified application programming interface, and the transaction can be processed using the entity identifier assigned to the third-party entity.

In some implementations, a process to execute a transaction may include receiving a transaction request to execute a transaction in which the transaction request includes a resource provider identifier of a third-party entity and an account identifier of an account of the third-party entity. An entity identifier can be determined based on the resource provider identifier of the third-party entity. The entity identifier may conform to a native format used by processing logic of a transaction processor. The account identifier can be verified as conforming to an account identifier scheme of the third-party entity. The transaction can then be executed using the entity identifier that conforms to the native format used by the processing logic of the transaction processor.

A computing system and/or processing server can be used to carry out the above techniques.

BRIEF DESCRIPTION OF THE DRAWINGS

FIG. 3 illustrates an example of an entity identifier mapping table, according to some implementations.

DETAILED DESCRIPTION

Figure 1:
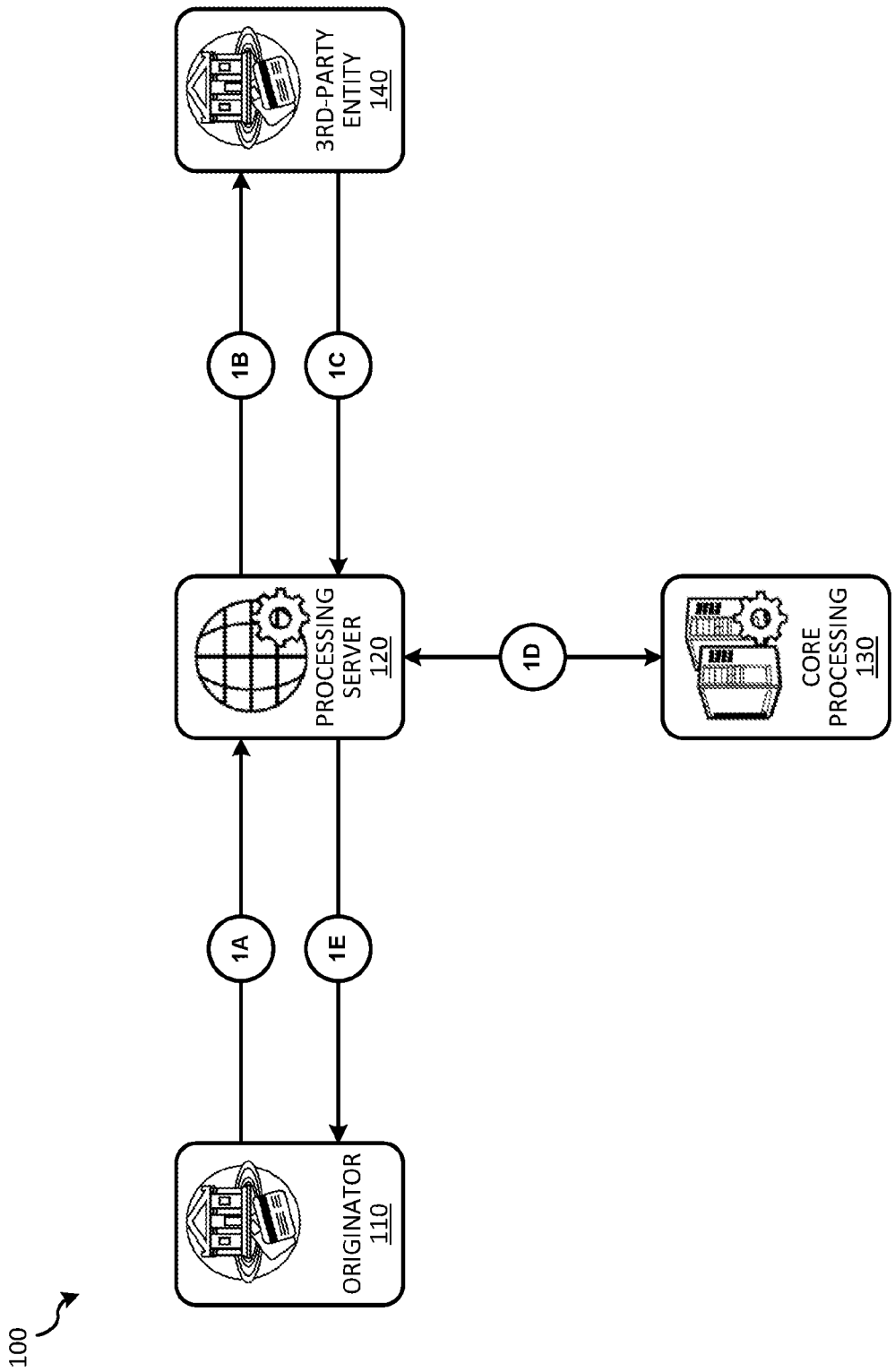
FIG. 1 illustrates a block diagram of a processing system environment for account lookup and verification, according to some implementations.

The techniques disclosed herein provide a processing system with the capability to process transactions associated with third-party accounts that are not established with the processing system. Such accounts can be referred to as non-native accounts. In some implementations, an application programming interface (API) used by the processing system to process transactions can be modified to recognize the non-native accounts to enable transactions for non-native accounts to be processed. In this manner, non-native account holders can take advantage of the infrastructure and capabilities of the processing system, such as the ability to route transactions globally through the processing system's interconnected network.

Prior to discussing the various embodiments, a description of some terms may be helpful in understanding the techniques disclosed herein.

A server computer may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A credential may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

A primary account number (PAN) is a type of account identifier, and may include any string, sequence of digits, or other identifier suitable to identify an account associated with a payment processing network. In some cases, PAN may include an issuer identification number, an individual account identifier, and a check digit. For example, a PAN may comprise the 16-digit sequence: "4123-4567-8901-2345" (the sequence has been broken into groups of 4 digits for readability). However, a PAN may be structured in any other suitable manner.

An AFT (Account Funding Transaction) is a transaction designed to supply funds to another account such as a credit, prepaid, debit, ATM or on-line account. In the present invention, an AFT is paying the resource provider bank for sending funds to the recipient and results in a debit to the sender's card account. The amount of the debit is the amount of the credit to be delivered to the recipient plus any fees being charged by the resource provider such as a transfer fee, or a currency conversion fee when the money transfer portal performs currency exchange and its acquirer submits the transaction in the preferred currency of the recipient.

An OCT (Original Credit Transaction) is typically a clearing and settlement credit transaction designed for use in business applications such as a business money transfer or business-to-consumer repayments. When used in the context of the present invention for money transfer, the OCT is the transaction used to deliver funds to the recipient account. It is separate from, and takes place after, the AFT transaction. This timing is to ensure that payment funds are secured before funds are sent to the recipient.

A sending account may include any account associated with a party sending funds in a transaction. For example, a sending account may be an account associated with a payment processing network, such as a credit card account or debit card account. In other cases, a sending account may be a bank account or other account not associated with a payment processing network. In yet other cases, the sending account may refer to a non-account instrument, such as a cash payment.

A recipient account may include any account associated with a recipient of funds in a transaction. In some cases, the recipient account may be an account associated with a payment processing network, such as a credit card account, debit card account, or an account associated with a payment token. In other cases, the recipient account may be a bank account or other account not associated with a payment processing network (e.g., a prepaid account, a deposit account with a biller or merchant, a transit transponder account, a mobile account, etc.). For example, in some cases, the recipient account may not be associated with a PAN. The recipient account may be maintained by a recipient bank.

An authorization request message may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An authorization response message may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization.

A verification request message can comprise a message that can be used to at least request verification of one or more personal data elements. In some embodiments, the data elements can be an address, a name, personal identifiable information, etc. In some embodiments, the verification request message may include other types of data elements such as account identifiers including source account identifiers, target account identifiers, etc. A verification request message can be in any suitable data format (e.g., ISO 8583, XML, etc.).

A verification response message can comprise any suitable message that responds to a verification request message. A verification response message may comprise a personal data element verification result such as an address verification result. A verification response message may be in any suitable data format (e.g., ISO 8583, XML, etc.).

The techniques disclosed herein provide a receive-side platform to enable entities to connect directly to a transaction processing network to receive push payouts. This platform may be referred to as "OPEN" (Open Payouts Enablement Network). The capability of the platform can be used by digital wallet providers, neo-banks and traditional financial institutes that want to receive instant fund transfers without having to issue cards/accounts of the transaction processor. OPEN may include standardized APIs, and may provide straight-through processing and guaranteed settlement, but may use simpler licensing and rules and supports processing of non-native numerics (account identifiers) and/or credentials such as IBANs (International Bank Account Numbers) or wallet IDs.

By simplifying how digital entities come into the network, OPEN may reinforce the transaction processor's role as a global network for senders and recipients to connect in a programmatic, standards-based way, instead of through bilateral agreements.

The following capabilities can be utilized to support OPEN:

The transaction processor may have established contracts and stable processes for settlement. For example, banks in certain countries may not issue certain types of transaction processor cards. However, the transaction processor may still routinely settle billions of dollars with these very banks for acquiring international ATM transactions. When seen through the "enterprise settlement" lens, the transaction processor may have long-term contracts, and may perform net settlement and manage liquidity with virtually all major retail banks in the world.

Processing of non-native numerics (account identifiers): Sophisticated account range mapping/routing capabilities can allow the transaction processor to manage authorization, clearing and settle transactions with non-native credentials in a seamless way.

Application programming interface (API) and/or secure file transfer protocol (SFTP) based delivery of authorizations, advices and reports: Send-side APIs for OCTs and APIs for receiving OCTs can be expanded to process non-native credentials. Settlement reports can also be delivered through API and SFTP channels.

Using the capabilities above, OPEN can bring together a multi-layer stack of components.

1. Modified scheme license: OPEN can be governed by a new/modified service license. This license can be issued on a standalone basis to wallets/non-native issuers or added as an optional addendum to an existing principal license. One criteria for evaluating clients' eligibility for an OPEN license are money transfer-related—regulatory license, AML (anti-money laundering) rating and KYC (know your customer) processes. Credit settlement risk, usually a high bar for most issuers and fintechs, is less of a factor, since OPEN licensees are usually the net recipients of funds form the transaction processor.

2. Common minimum rules: OPEN may have a compact set of rules to ensure trust and service levels and govern dispute resolution between originators and OPEN recipients. These can be similar to OCT rules, but can be more flexible, with the main focus on AML/KYC obligations, value and velocity limits, rules for posting speed and authorization rates, and adherence to dispute protocols and technical specifications.

3. Settlement: OPEN transactions can settle to existing SREs if available. In case of wallets or new-to-platform licensees, new settlement accounts can be set up. Settlement currencies can be determined by existing practice for ATM acquiring in the market—since the flow of funds for an OPEN recipient is similar to that for an ATM acquirer; e.g., client makes funds available to consumer based on the settlement guarantee, and the transaction processor credits client for the same during the next settlement cycle.

4. Non-native numerics processing: This can make it simpler for receive-side clients to integrate transaction messages and reconciliation reports with their core systems without having to build mapping and translation services themselves to link PANs/tokens to their account numbers. To that end, OPEN can provide support for numerics including: country code, bank routing code, customer account number; SWIFT codes and IBANs as valid numerics; and/or a combination of country code and wallet account id can be used.

5. APIs/web-services for authorization, advices and reporting: Receive-side APIs can be enhanced to carry non-native credentials and rationalized approval and decline codes, relevant to incoming credits. Settlement reports will be delivered through SFTP/API channels—and the reports can be re-designed and simplified to meet the needs of OPEN recipients. In addition to authorization and reporting services, OPEN may also support new APIs for account name validation and request for payment.

To enable a processing system to process third-party accounts, the processing system can onboard a third-party entity by obtaining an account identifier scheme used by the third-party entity, and assigning an entity identifier to the third-party entity. The entity identifier can conform to the native format of the account identifiers used by the processing system. In this manner, a transaction involving an account of the third-party entity can be processed internally by the processing system using the entity identifier. For example, a card processing system that such as Visa or Mastercard processes transactions using 16-digit card account numbers, of which the first 6 digits can be used as a bank identification number (BIN). Transactions are processed and routed to the proper authorizing entity (e.g., the issuing bank of the account) using the BIN. In such implementations, a third-party entity such as a mobile wallet service provider that does not use 16-digit account numbers can be assigned a BIN by the processing system, and transactions involving accounts of the mobile wallet service provider can be processed internally by the processing system using the assigned BIN.

Each assigned BIN can also be associated with a set of transaction parameters for the third-party entity such as an application identifier level (e.g., used by the processing system to differentiate between different types of supported push payments such as disbursement transfer, peer-to-peer transfer, merchant payment, etc.), domestic and/or cross-border transfer support, and transaction limits such as a transaction velocity limit and/or maximum transaction amount. The transaction parameters may also include parameters such as foreign exchange setup, billing currency, and settlement currency. More generally, the transaction parameters can include parameters that are used by the processing system's logic to make processing decisions.

In some implementations, the processing system may employ a non-native numeric scheme to recognize transaction requests involving third-party entity accounts. For example, the non-native numeric scheme may include a combination of resource provider type indicating the type of account supported by the third-party entity, a country code indicating the country associated with the third-party entity, and a resource provider identifier such as the name of the entity or a sort code of the entity if it has one (e.g., SWIFT code, IBAN code, routing number, etc.). Each unique combination of these elements can map to a unique entity identifier assigned by the processing system. In some implementations, a third-party entity may have account ranges that correspond to different levels of service, and each account range of the third-party entity may have a unique entity identifier. The application programming interface used by the processing system to received and process transactions can be modified to parse incoming requests for the non-native numeric scheme. The processing system may then retrieve the entity identifier associated with the third-party account using the elements of the non-native numeric scheme, and process the transaction internally using the entity identifier.

To initiate a transfer, a sender may send a transfer request by calling a transfer request API with the parameters {resource provider type, country, resource provider identifier, and target account}. By way of example, to send funds to a Paypal mobile wallet account belonging to bob@gmail.com, the sender may send a transfer request by calling a transfer request API with the parameters "W:US:Paypal:bob@gmail.com", where "W" indicates a mobile wallet account, "US" indicates a U.S. entity, "Paypal" indicates the name of the service provider, and bob@gmail.com indicates the account identifier in Paypal's system. As another example, to send funds to a Barclays United Kingdom bank account, the sender may send a transfer request by calling a transfer request API with the parameters "B:UK:BUKBGB22:0256587785", where "B" indicates a bank account, "UK" indicates a United Kingdom entity, "BUKBGB22" indicates the IBAN number of the bank, and 0256587785 indicates the account identifier in Barclays bank's system. The processing system (e.g., Visa) receiving the transfer request API call can parse the parameters and determine the entity identifier (e.g., a BIN) associated with the recipient service provider, and process the transaction using the entity identifier in the native format of the processing system.

FIG. 1 illustrates a block diagram of a processing system environment 100, according to some embodiments. Processing system environment 100 can provide account lookup and verification services prior to processing a transaction with a non-native account. For example, the account lookup and verification services can be used to verify a target account and to obtain transaction parameters of the account to ensure transactions involving the non-native account adheres to the parameters of the account provider.

Processing system environment 100 may include an originator 110, a processing server 120, core processing logic 130, and a third-party entity 140. Originator 110 can be an entity associated with a sender of funds such as an acquirer, a transaction service provider, or other financial institution. Third-party entity 140 can be a resource provider such as a transaction serve provider. Examples of third-party entity 140 may include mobile wallet providers, peer-to-peer transaction providers, banks, or other financial institutions that provide accounts. In some implementations, the accounts provided by the third-party entity 140 may be unaffiliated with a transaction processing system implemented by processing server 120 and/or core processing logic 130, and transactions involving such accounts are not traditionally processed by the transaction processing system.

Processing server 120 can be a server associated with a transaction processing system that can receive incoming transaction requests. Core processing logic 130 implements the processing network of the transaction processing system, and may include data processing subsystems, networks, and operations used to support and deliver authorization services, exception file services, and clearing and settlement services. An exemplary transaction processing system is Visa, and core processing logic 130 may include VisaNet™. Transaction processing systems such as VisaNet™ are able to process credit card transactions, debit card transactions, and other types of funds transfer transactions. VisaNet™, in particular, includes a VIP system (Visa Integrated Payments system) which processes authorization requests and a Base II system which performs clearing and settlement services. The transaction processing system may use any suitable wired or wireless network, including the Internet.

Messages between the components illustrated in FIG. 1 can be transmitted using a communications protocol such as, but not limited to, File Transfer Protocol (FTP); HyperText Transfer Protocol (HTTP); Secure Hypertext Transfer Protocol (HTTPS), SSL, ISO (e.g., ISO 8583), and the like. The communications network that allow the computers to communicate may include any one and/or combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as Wireless Application Protocol (WAP), I-mode, etc.); and the like.

The communications network can use any suitable communications protocol to generate one or more secure communication channels. A communications channel may, in some instances, comprise a secure communication channel, which may be established, for example, through the use of mutual authentication and a session key, and establishment of a Secure Socket Layer (SSL) session. In some implementations, the communications sent to processing server 120 can be in the form of API calls over a secure communications channel.

At step 1A, originator 110 may send an account lookup/verification request to processing server 120. The account lookup/verification request can be in the form of an API call to the programming interface of processing server 120 or a verification request message, and may include at least a resource provider identifier and an account identifier. The resource provider identifier can be a string that contains the name of the resource provider, a sort code such as a SWIFT code, IBAN code, or routing number, etc. The account identifier can be, for example, a string of alphabet or alphanumeric characters that identifies a target account (e.g., an email address or a username of an account holder), or a numeric account number. In some implementations, the account lookup/verification request may also include the actual name of the account holder and/or other data elements such as the resource provider type, country associated with the account, etc.

At step 1B, processing server 120 may parse the account lookup/verification request to obtain the resource provider identifier to identify the third-party entity, and forward the account lookup/verification request with the account identifier to third-party entity 140. Upon receiving the account lookup/verification request, third-party entity 140 can verify that the account identifier is valid, and that the account associated with the account identifier is active and in good standing. In some implementations, third-party entity 140 may also perform additional verification such as checking the name of the account holder. Third-party entity 140 may also send a notification to the account holder to inform the account holder that an account lookup/verification request has been received for the account.

At step 1C, third-party entity 140 may send an account lookup/verification response (e.g., a verification response message) to processing server 120. The account lookup/verification response may include an indication as to whether the account is active, and whether the name matches the account holder of the account. If the lookup/verification response indicates that the account is inactive (e.g., an invalid account number, a suspended account, etc.), or that the name does not match the account holder, processing server 120 may send an error message indicating the issue to originator 110.

If the lookup/verification response indicates that the account is active and that the name matches the account holder, processing server 120 may retrieve the transaction parameters associated with the account and third-party entity at step 1D. For example, processing server 120 may use the combination of a resource provider type, country, and resource provider identifier to lookup the entity identifier associated the third-party entity 140. In some implementations, the set of data elements used to look up the entity identifier may also include the account identifier if account ranges are supported. In some implementations, the resource provider identifier itself may be sufficient to retrieve the entity identifier.

Once the entity identifier has been retrieved, processing server 120 may provide the entity identifier to core processing logic 130 to obtain transaction parameters associated with the entity identifier. In some implementations, processing server 120 may locally store the transaction parameters, and thus can obtain the transaction parameters without involving core processing logic 130. The transaction parameters may include information such as the types of push payments supported (e.g., fast funds, original credit transaction, etc.), whether domestic and/or cross border transfers are supported, billing and/or settlement currency, transaction limits, etc. The transaction parameters are then incorporated into the lookup/verification response and sent to originator 110 to inform originator 110 of the account status and the types of transactions allowed for the account as indicated by the transaction parameters.

Figure 2:
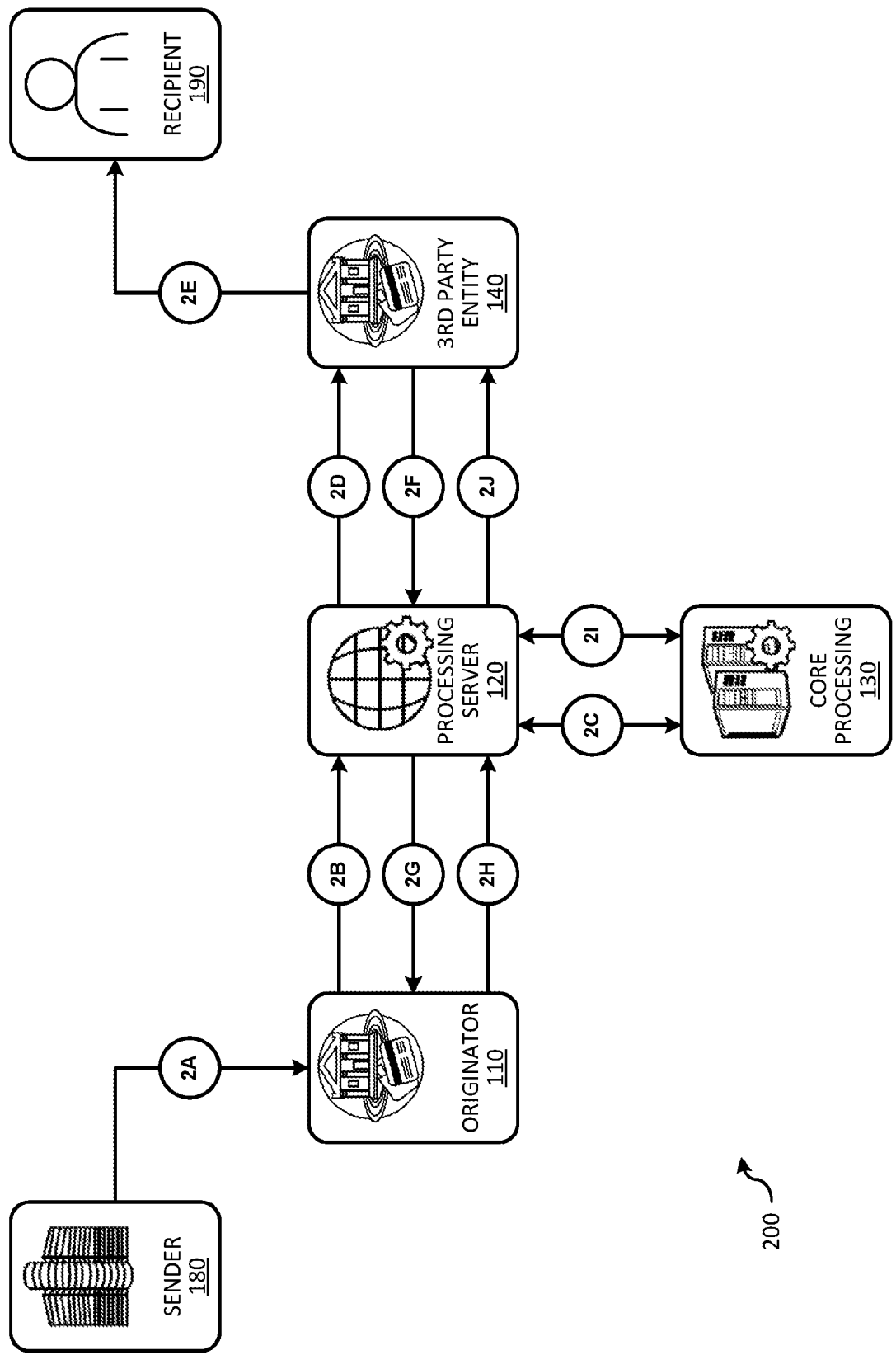
FIG. 2 illustrates a block diagram of a processing system environment for processing a transaction involving a non-native account, according to some implementations.

FIG. 2 illustrates a block diagram of a processing system environment 200 for processing transactions involving non-native accounts, according to some embodiments. Processing system environment 200 may include similar components as FIG. 1 including originator 110, processing server 120, core processing logic 130, and third-party entity 140. FIG. 2 also illustrates a sender 180 and a recipient 190 in processing system environment 200. Sender 180 and/or recipient 190 can be an individual or an entity such as a business or a merchant.

By way of example, sender 180 may perform a transaction to send $100 USD to a recipient's United Kingdom bank account at Barclays bank. At step 2A, to initiate the transaction, sender 180 may provide the details of the transaction (e.g., amount of $100), resource provider identifier of the bank (e.g., BUKBGB22), and the recipient's account identifier (e.g., 0256587785) to originator 110.

At step 2B, originator 110 may generate a transfer request API function call based on the received information, and transmit the API call to processing server 120. For example, the transfer request API call may include the character string "B:UK:BUKBGB22:0256587785" with a transaction amount of $100 USD, where "B:UK" indicates the target account is a bank account in United Kingdom). In some implementations, the information can be sent using a different form and/or format. For example, the transfer request can sent be in the form of an authorization request message, or the information can be sent in a file or other form of messages or communications.

At step 2C, processing server 120 may receive the transfer request and parse the request for information that can be used to retrieve an entity identifier that is in the native format of processing server 120. For example, processing server 120 may parse the parameters of the API call to obtain the IBAN code of the recipient bank as "BUKBGB22." Processing server 120 may retrieve the entity identifier assigned to IBAN code "BUKBGB22" from a database or mapping table. Referring to the mapping table 300 shown in FIG. 3, the entity identifier mapped to the resource provider identifier of "BUKBGB22" is "486483." Processing server 120 may also obtain the transaction parameters associated with the entity identifier "486483," and determine that the target account supports cross border transactions, that the billing and settlement currencies is in British pounds (GBP), and that the foreign exchange is to be performed by the transaction processing system. The transaction parameters may also include a transaction limit such as a transaction velocity limit and a maximum amount limit.

The entity identifier, which is in a format native to core processing logic 130, can be used by core processing logic 130 to perform functions such as authentication, authorization, and transaction routing. Core processing 130 may verify that the transaction details of the transfer are within the allowable transaction parameters for the target account (e.g., within the transaction limits), and perform foreign exchange as indicated by the transaction parameters. For example, assuming that the exchange rate of the transaction processing system is $1 USD to 0.7 GBP, core processing logic 130 may convert the $100 USD transaction amount to the billing/settlement currency of 70 GBP.

At step 2D, after processing logic 130 has processed the transaction, processing server 120 may send the transfer request including the account identifier and the converted transaction amount of 70 GBP to third-party entity 140, which in this example would be Barclays bank. At step 2E, third-party entity 140 may deposit the 70 GBP into the recipient's account and send a notification of the deposit to recipient 190. At step 2F, third-party entity 140 may send a transfer response indicating that the transfer is successful to processing server 120. The transfer response can be, for example, in the form of a transfer response API or an authorization response message. At step 2G, processing server 120 may then forward the transfer response to originator 110.

At a later point in time, settlement and clearing may occur. At step 2H, processing server 120 may pull $100 USD from originator 110. At step 2I, core processing logic 130 performs settlement and clearing using the entity identifier "486483" associated with third-party entity 140 or the recipient's bank. At step 2J, 70 GBP is deposited into the third-party entity 140 to complete the settlement. By using an entity identifier that conforms to the native format used by the transaction processing system, settlement guarantees and the subsequent reporting can be carried out using the transaction processing system's infrastructure.

FIG. 3 illustrates an example of an entity identifier mapping table 300 that can be maintained by a transaction processing system (e.g., processing sever 120 and/or core processing logic 130), according to some embodiments. It should be understood that entity identifier mapping table 300 can be implemented using a database or other data structures.

Entity identifier mapping table 300 stores one or more entries for each third-party entity. The third-party entities listed in entity identifier mapping table 300 may not necessarily provide accounts affiliated with the transaction processing system, and thus the transaction processing system is traditionally unable to process transactions involving accounts from these third-party entities. Nevertheless, by assigning an entity identifier that conforms to the native format used by the transaction processing system to process transactions, these third-party entities can leverage the infrastructure of the transaction processing system to route and process transactions involving accounts of the third-party entities.

Entity identifier mapping table 300 may contain various fields associated with a third-party entity including account type 302, recipient country 304, resource provider identifier 306, account range 308, entity identifier 310, and transaction parameters 312. Account type 302 indicates that type of accounts that are provided by the third-party entity. For example, account type 302 may indicate whether the third-party entity provides mobile wallet accounts, bank accounts, or other types of transaction accounts. Recipient country 304 indicates the country of the accounts provided by the third-party entity.

Resource provider identifier 306 indicates who the third-party entity is. Resource provider identifier 306 can be an alphabet string, a numeric string, or an alphanumeric string. Resource provider identifier 306 can be the name of the third-party entity, or can be a sort code (e.g., SWIFT code, IBAN code, routing number, etc.) associated with the third-party entity. The resource provider identifier 306 may have a different number of characters than the entity identifier 310 used by the transaction processing system to process transactions, and thus the transaction processing system is traditionally unable to process transactions using the resource provider identifier 306. Some third-party entities may support account ranges in which different ranges of account identifiers are provided with different levels of services and products. For such third-party entities, entity identifier mapping table 300 may store the different account ranges 308, and each account range can be associated with a different entity identifier 310.

Entity identifier 308 is an identifier that conforms to the native format used by the transaction processing system. Depending on the transaction processing system, the entity identify conforming to the native format can be an alphabet string, a numeric string, or an alphanumeric string. By way of example, a transaction processing system such as Visa traditionally uses a 6-digit BIN that starts with a "4" to identify the issuing bank to route and process transactions. The 6-digit BIN is typically the first 6 digits of a 16-digit account identifiers. Thus, to conform to this native format used by the transaction processing system, the entity identifiers 310 listed in entity identifier mapping table 300 are each 6-digit numeric strings that starts with a "4." It should be noted that the third-party entities may not necessarily issue account identifiers having a BIN that starts with a "4," and thus the transaction processing system may traditionally be unable to process transactions involving accounts from these third-party entities.

Transaction parameters 312 may include a set of parameters that the transaction processing system may use to process transactions associated with a particular third-party entity. For example, transaction parameters 312 may include a billing currency (BC) indicating the currency used for billing the account, and a settlement currency (SC) indicating the currency used for settlement on the account. Transaction parameters 312 may also include an indication as to whether domestic transfers (DOM) and/or cross-border transfers (XB) are allowed on the account. Transaction parameters 312 may also include a designation as to the entity performing any foreign exchange (FX). For example, the foreign exchange can be carried out by the transaction processing system (e.g., Visa), or by the third-party entity partner itself. Transaction parameters 312 may also include an indication as to whether the account accepts push payments (PP) and/or fats funds transfers (FF). Transaction parameters 312 may further include transaction limits such as a transaction velocity limit (VEL) and a maximum transaction amount limit (MAX). The transaction velocity limit may indicate the maximum number of transactions per day allowed for a particular account, and the maximum transaction amount limit may indicate the maximum amount allowed for each transaction. The maximum transaction amount can be denoted, for example, in the settlement currency. It should be understood that these are just a few examples of the transaction parameters that can be stored in entity identifier mapping table 300, and that other implementations may include other parameters not specifically shown, and/or may include fewer parameters or more parameters than shown.

By way of example, the first entry in entity identifier mapping table 300 is for Alipay, which is a mobile wallet provider. The country associated with the accounts of Alipay is China, and Alipay does not use account ranges. The entity identifier assigned to Alipay is "401218." The transaction parameters associated with Alipay indicates that both the billing and settlement currencies are in Chinese Yuan (RMB), and the accounts support both domestic and cross-border transfers. The foreign exchange is to be performed by Visa, and the accounts support push payments but not fast funds. The transaction velocity limit is 10 transactions per day, and the maximum amount per transaction is 50,000 RMB.

As another example, the third entry in entity identifier mapping table 300 is for Rakuten Bank, which is a Japanese bank. The resource provider identifier is listed as "RAKTJPJT," which is the SWIFT code of Rakuten Bank. The country associated with the accounts of Rakuten Bank is Japan, and account ranges are not supported. The entity identifier assigned to Rakuten Bank is "454200." The transaction parameters associated with Rakuten Bank indicates that both the billing and settlement currencies are in Japanese Yen (JPY), and the accounts support both domestic and cross-border transfers. The foreign exchange is to be performed by Rakuten Bank itself, and the accounts support both push payments and fast funds. The transaction velocity limit is 20 transactions per day, and the maximum amount per transaction is 1,000,000 Yen.

As a further example, the fifth entry in entity identifier mapping table 300 is for UBS Bank, which is a Swiss bank. The resource provider identifier is listed as "026007993," which is the routing number of UBS Bank. The country associated with the accounts of UBS Bank is Switzerland, and two account ranges are supported. The entity identifier assigned to the first account range of account identifiers 02300000 to 02319999 is "490001," and the entity identifier assigned to the second account range of account identifiers 02320000 to 02349999 is "490002."

The transaction parameters associated with the first account range indicates that the billing currency is in U.S. dollar (USD) and settlement currency is in Swiss Franc (CHF). The accounts in this range support both domestic and cross-border transfers. The foreign exchange is to be performed by UBS Bank itself, and the accounts support both push payments and fast funds. The transaction velocity limit is 25 transactions per day, and the maximum amount per transaction is 20,000 Swiss Francs.

Figure 4:
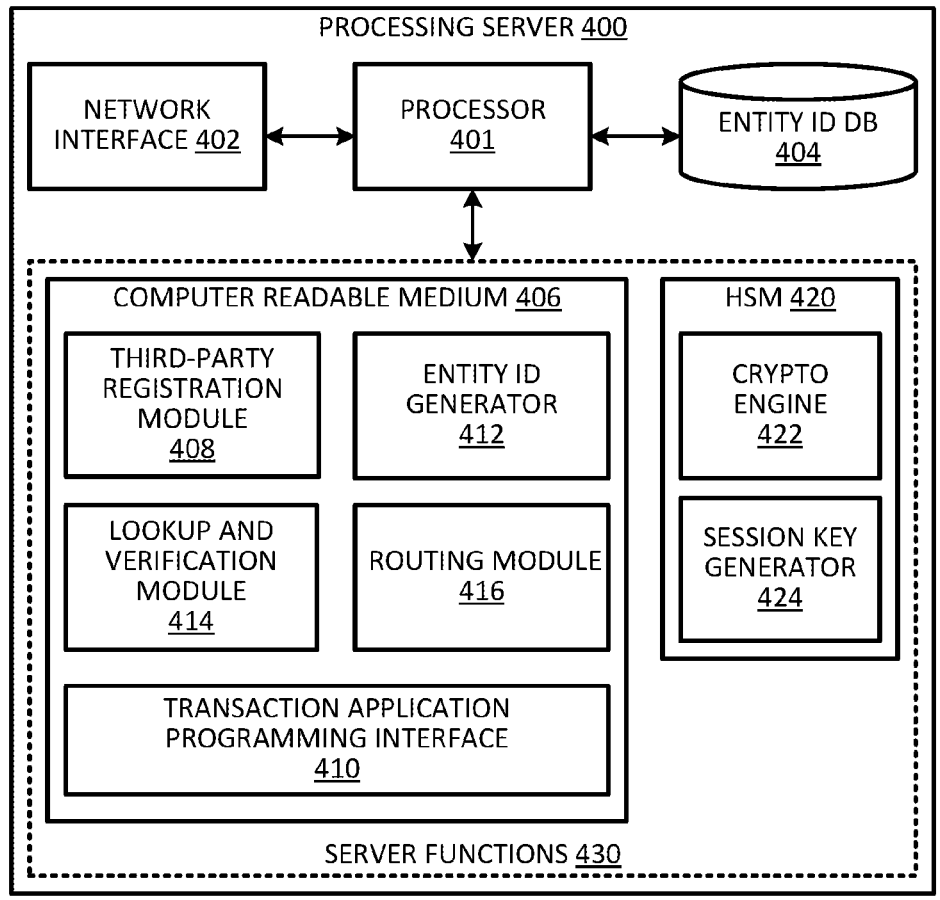
FIG. 4 illustrates a block diagram of a processing server, according to some implementations.

The transaction parameters associated with the second account range indicates that both the billing and settlement currencies in this account range is in U.S. dollar (USD). The accounts in this range supports only cross-border transfers. The foreign exchange is to be performed by UBS Bank itself, and the accounts support both push payments and fast funds. The transaction velocity limit is 50 transactions per day, and the FIG. 4 illustrates a block diagram of a processing server 400 (e.g., processing server 102), according to some embodiments. In some embodiments, one or more server 400 can be used, for example, to implement a networked system of processing servers. Processing server 400 may include a processor 401 coupled to a network interface 402 and a computer readable medium 406. In some embodiments, processing server 400 may also include a hardware security module (HSM) 420. Processing server 400 may also include an entity identifier database 404 that may be internal or external to processing sever 400. Entity identifier database 404 may store a mapping of entity identifiers to third-party entities, and may store information such as those shown in FIG. 3.

Processor 401 may include one or more microprocessors to execute program components for performing server functions 430. Network interface 402 can be configured to connect to one or more communication networks to allow processing server 400 to communicate with other entities. Computer readable medium 406 may include any combination of one or more volatile and/or non-volatile memories, for example, RAM, DRAM, SRAM, ROM, flash, or any other suitable memory components. Computer readable medium 406 may store code executable by the processor 401 for implementing some or all of the server functions 430. For example, computer readable medium 406 may include a third-party registration module 408, transaction APIs 410, an entity identifier generator 412, a lookup and verification module 414, and a routing module 416.

Third-party registration module 408 may register a third-party entity with the entity identifier database 404. A third-party entity pay provide information about the third-party entity such as an account identifier scheme and transaction parameters used by the third-party entity, as well as other information such as those shown in FIG. 3. Upon receiving a registration or enrollment request, third-party registration module 408 may verify the third-party entity, request entity identifier generator 412 to generate an entity identifier for the third-party entity, and store information about the third-party entity including a mapping of the entity identifier in entity identifier database 404.

Entity identifier generator 412 may generate entity identifiers for third-party entities that may not have an entity identifier used by the transaction processing system. The entity identifiers being generated conforms to the native format used by the transaction processing system. In some implementations, the entity identifiers can be generated randomly, pseudo-randomly, incrementally (e.g., counting up), or using other suitable schemes. If an entity identifier generated by the scheme is already in use, another entity identifier can be generated for the third-party entity being enrolled. Lookup and verification module 414 can be used to perform account lookup and verification functions such as those described with reference to FIG. 1 once a third-party entity has been enrolled. Routing module 416 can be used to route requests and responses to the third-party entities.

Transaction APIs 410 may include a set of APIs that external entities can invoke to interact with the core processing logic of the transaction processing system. For example, transaction APIs 410 may implement a transfer request API that external entities can call to initiate a transaction. In some implementations, the transaction APIs can be modified to recognize transaction requests involving the different third-party entities. For example, the transaction APIs 410 can be modified to recognize non-native account identifiers, verify that the non-native account identifiers correspond to the account identifier scheme used by a particular third-party entity, and initiate core processing logic using a native entity identifier associated with the third-party entity.

In some embodiments, processing server 400 may include a HSM 420 to perform secure functions such as encryption and decryption operations and generation of cryptographic keys used for the encryption and decryption operations. For example, HSM 420 may include a cryptography engine 422 to execute encryption algorithms such as AES, DES, TDES/TDEA, or other suitable encryption algorithms using cryptographic keys of any length (e.g., 56-bit, 128-bit, 169-bit, 192-bit, 256-bit, etc.). HSM 420 may also implement a session key generator 424 to generate a session key for external communications. For example, the session key can be used to establish a secure communication channel (e.g., TLS, SSL, etc.) between external entities and processing server 400. Although processing server 400 has been described with a HSM implementing some of their functions, it should be understood that other functionalities can be implemented inside a HSM as well. Furthermore, some or all of the respective HSM functionalities can also be implemented outside of a HSM.

Figure 5:
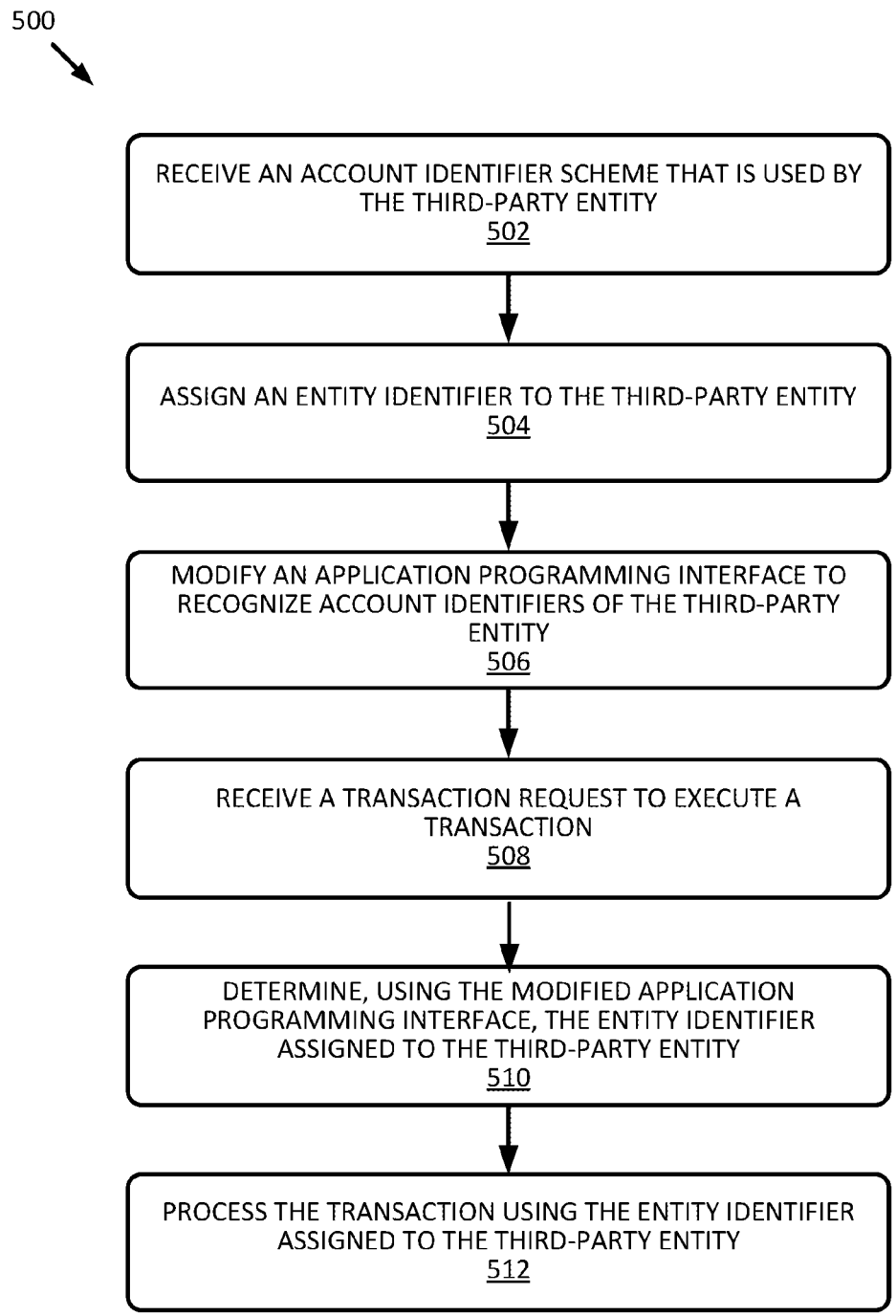
FIG. 5 illustrates a flow diagram of a process to enable a processing system to process non-native accounts, according to some implementations.

FIG. 5 illustrates a flow diagram of a process 500 for enabling non-native account processing at a transaction processing system, according to some implementations. Process 500 can be performed, for example, by a processing server. Processing of non-native accounts of a third-party entity can be achieved by assigning an entity identifier conforming to the native format of the processing system, and modifying the processing logic (e.g., APIs) utilized at a processing server associated with the processing system.

At block 502, the processing server may receive, from a third-party entity, an account identifier scheme that is used by the third-party entity to provide access to accounts associated with the third-party entity. The third-party entity can be an entity that does not provide accounts affiliated with the transaction processing system, and thus the accounts of the third-party entity can be non-native accounts that are not recognized by the transaction processing system. The account identifier scheme may include information about the account identifiers used by the third-party entity such as the number of characters, whether the account identifiers are numeric only or alphanumeric, hyphenation or other separation characters, presence of static characters, prefixes, suffixes, country codes, routing codes, etc. In some implementations, the account identifier scheme can be, for example, an email address, a phone number, a username, or other personal identification information. In some implementations, the account identifier scheme can take on other formats that the third-party entity uses to recognize an account.

At block 504, an entity identifier can be assigned to the third-party entity. The entity identifier being assigned conforms to the native format used by the processing server and the transaction processing system. For example, if the transaction processing system uses a 6-digit BIN to process transactions, the entity identifier being assigned to the third-party would be a 6-digit number that resembles a BIN. By assigning an entity identifier that conforms to the native format, transactions involving accounts of the third-party entity can be process and routed using the infrastructure of the transaction processing system.

At block 506, an application programming interface (API) of the processing server can be modified to recognize the account identifiers used by the third-party entity. For example, program code can be inserted into the APIs used by the processing server to parse the parameters sent with an API call to determine a target account of a transaction and the third-party entity associated with the target account. The program code can further be modified to verify that the account identifier adheres to the account identifier scheme used by the third-party entity. By way of example, if the account identifier scheme uses emails as an account identifier, the API can be modified to check that a received account identifier for the third-party entity is a properly formatted email address that includes a string followed by "@" followed by a domain name. If the account identifier scheme uses a 10-character alphanumeric string as an account identifier, the API can be modified to check that a received account identifier for the third-party entity is a 10-character alphanumeric string. The program code can also be modified to retrieve the entity identifier associated with the third-party entity such that subsequent processing and routing of a transaction can be effected using the entity identifier.

A mapping of entity identifiers to resource provider identifiers can be stored in a third-party entity identifier database (e.g., a mapping table). In some implementations, a resource provider type and/or country associated with the third-party entity can also be stored. If account ranges of the third-party entity are supported, the account range can also be stored. At a minimum, the resource provider identifier can be used to retrieve the entity identifier if the entity identifier is unique to a particular resource provider identifier. In some implementations, a combination of the resource provider identifier together with one or more of a resource provider type, country, and account range may map to a unique entity identifier. For example, if third-party entity has a plurality of account ranges, and each account range of the third party entity can be assigned a different entity identifier. The entity identifier database may further store transaction parameters associated with the third-party entity. The transaction parameters may include, for example, a billing currency, a settlement currency, a transaction velocity limit, a transaction amount limit, and/or other parameters such as those described with reference to FIG. 3.

At block 508, the processing server may receive a transaction request to execute a transaction. The transaction request may include a resource provider identifier of the third-party entity (e.g., name, sort code, etc.) and an account identifier of an account of the third-party entity (e.g., target account of the transaction being requested). The transaction request can be received as part of a transaction request API call invoked by an originator or sender of the transaction. The transaction request may also include a transfer amount. In some implementations, the transaction request may also include a resource provider type of the third-party entity indicating the type of account provided by the third-party entity and/or a country associated with the account. In some implementations, the transaction request can be received over a secure communication channel.

At block 510, the processing server, using the modified application programming interface, can determine the entity identifier associated with the third-party entity. For example, the modified application programming interface can parse the transfer request to obtain the resource provider identifier of the third-party entity. In some implementations, the resource provider identifier may be sufficient to retrieve the entity identifier associated with the third party entity from the third-party entity identifier database. In some implementations, the resource provider identifier can be combined with a resource provider type and/or country parsed from the transfer request to lookup the entity identifier. In some implementations, the account identifier parsed from the transfer request may also be used to determine which account range that the target account belongs to, and to retrieve the entity identifier unique to that account range.

Figure 6:
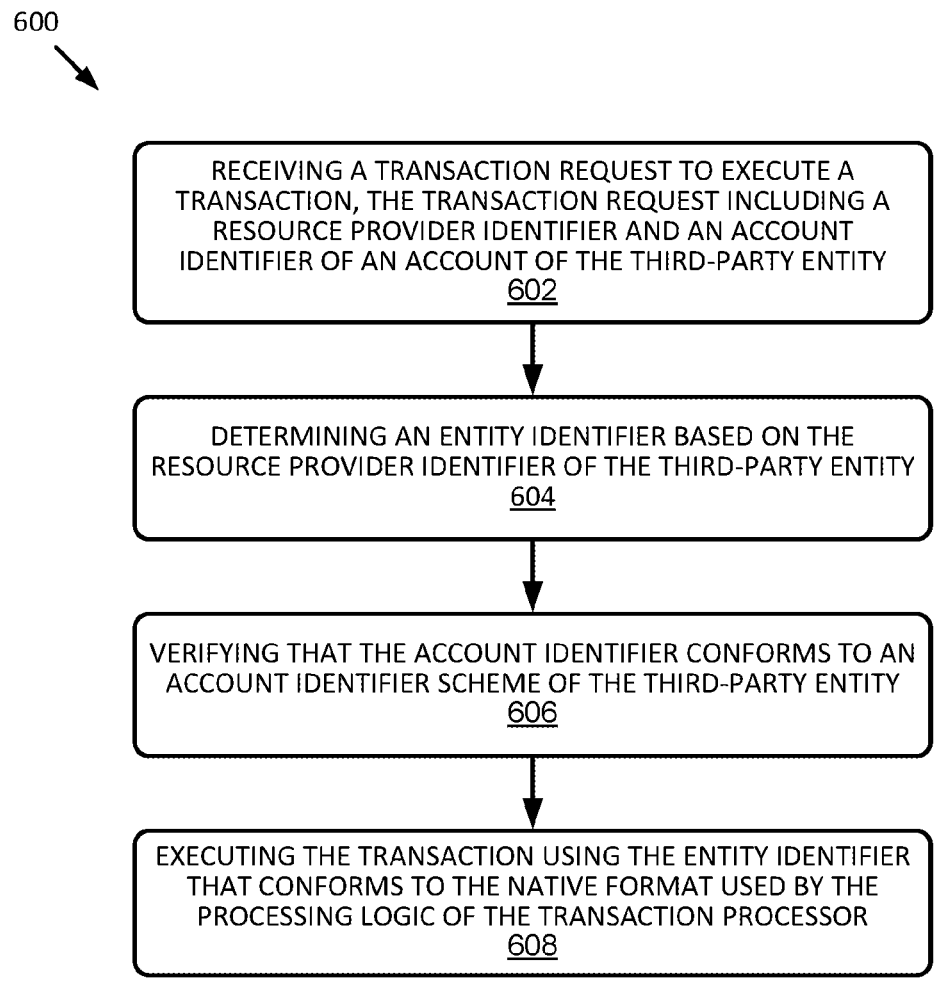
FIG. 6 illustrates a flow diagram of a process to execute a transaction involving a non-native account, according to some implementations.

FIG. 6 illustrates a flow diagram of a process 600 for processing a transaction involving a non-native account, according to some implementations. Process 600 can be performed, for example by core processing logic implemented using one or more computing device of a transaction processor system, and the computing device perform process 600 need not be the same as the processing server that assigned the entity identifier to a third-party entity. The process blocks of process 600 can be similar to those described above with reference to FIG. 5, and thus a detailed description of which need not be repeated.

At block 602, a transaction request to execute a transaction is received. The transaction request may include a resource provider identifier of a third-party entity, and an account identifier of an account of the third-party entity. At block 604, an entity identifier assigned to the third-party entity can be determined based on the resource provider identifier of the third-party entity (e.g., by looking up the entity identifier using the resource provider identifier). The entity identifier may conform to the native format used by processing logic of a transaction processor system. At block 606, a verification can be performed to verify that the account identifier in the transaction request conforms to the account identifier scheme of the third-party entity. Transaction parameters of the third-party entity can also be retrieved, and the transaction being requested can be verified to be within the transaction parameters associated with the entity identifier. At block 608, the transaction is executed using the entity identifier that conforms to the native format used by the processing logic of the transaction processor system. For example, the transaction can be executed by performing routing, authentication, authorization, clearing, and settlement of the transaction using the assigned entity identifier.

The techniques disclosed herein provide various technical advantages. For example, accounts that are not native to a processing system which cannot be traditionally be processed by the processing system can be routed and executed by the processing system without performing an overhaul of the infrastructure of the processing system. The updates that may be needed to support the non-native accounts can be implemented at the API level at the interface between the processing system and external entities. As such, it may be unnecessary to update the internal core processing logic of the processing system. The techniques disclosed herein also expands the interoperability of accounts affiliated with different providers and different processing systems. This also allow account holders to leverage services and capabilities that may otherwise not be available to through the third-party provider.

Various computing devices, communication devices, computers, servers, and the like described herein can be implemented using one or more processors coupled to a memory that store code or instructions, which when executed by the one or more processors, cause the device to perform one or more of the methods and processes described herein. Memory, storage media, and computer-readable media for containing code, or portions of code described herein, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer.

The methods, processes, and techniques described herein are exemplary in nature, and may perform one or more of the steps or functions in a different order than those described herein, include one or more additional steps of functions not specially described, omit one or more steps or functions, combine one or more steps or functions into a single step/function/component, split up one or more steps into multiple steps/functions/components, and/or any combination thereof. Furthermore, one or more feature from one embodiment can be combined with another embodiment without departing from the scope of the disclosed techniques.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary All patents, patent applications, publications, and descriptions mentioned above are herein incorporated by reference in their entirety for all purposes. None is admitted to be prior art.

What is claimed is:

1. A method for conducting a transaction with a non-native account, the method comprising:
   receiving an account identifier scheme that is used by a third-party entity to provide access to accounts associated with the third-party entity,
   wherein the third-party entity is a mobile wallet service provider;
   assigning an entity identifier to the third-party entity based on the account identifier scheme that is used by the third-party entity,
   wherein the entity identifier that is assigned to the third-party entity conforms to a native format used by a processing system;
   modifying an application programming interface (API) to recognize account identifiers of the third-party entity by inserting code into the API to parse parameters sent with an API call to determine a target account of the transaction and the third-party entity associated with the target account,
   wherein, based on the modifying, recognizing, by the application programming interface the account identifiers of payment accounts of the third-party entity,
   wherein the inserted code is configured to verify that the account identifiers adhere to the account identifier scheme used by the third-party entity;
   receiving a transaction request to execute the transaction, the transaction request including a resource provider identifier of the third-party entity and an account identifier of an account of the third-party entity,
   wherein the resource provider identifier of the third-party entity identifies a name of a resource provider;
   determining, using the modified application programming interface, the entity identifier assigned to the third-party entity; and
   processing the transaction using the entity identifier assigned to the third-party entity.

2. The method of claim 1, further comprising verifying that received account identifier conforms to the account identifier scheme of the third-party entity.

3. The method of claim 1, wherein the transaction request further includes a resource provider type of the third-party entity.

4. The method of claim 1, further comprising storing a mapping of entity identifiers to resource provider identifiers in a third-party entity identifier database.

5. The method of claim 4, further comprising storing transaction parameters associated with the third-party entity in the third-party entity identifier database.

6. The method of claim 5, wherein the transaction parameters include a billing currency or a settlement currency associated with the third-party entity.

7. The method of claim 5, wherein the transaction parameters include a transaction velocity limit and a transaction amount limit.

8. The method of claim 7, further comprising verifying that the transaction is within the transaction velocity limit and the transaction amount limit.

9. The method of claim 1, wherein the third-party entity has a plurality of account ranges, and wherein each account range is assigned a different entity identifier.

10. The method of claim 1, wherein the entity identifier conforms to a bank identifier format.

11. A computing system for conducting a transaction with a non-native account, the system comprising:
    one or more processors; and
    a memory storing code, which when executed by the one or more processors, causes the computing system to implement operations including:
    receiving a transaction request to execute the transaction, the transaction request including a resource provider identifier of a third-party entity, and an account identifier of an account of the third-party entity,
    wherein the third-party entity is a mobile wallet service provider,
    wherein an application programming interface (API) recognizes the account identifier of a payment account of the third-party entity based at least in part on a modifying of the API by inserting code into the API to parse parameters sent with an API call to determine a target account of the transaction and the third-party entity associated with the target account,
    wherein the inserted code is configured to verify that account identifiers adhere to an account identifier scheme used by the third-party entity;
    determining an entity identifier based on the resource provider identifier of the third-party entity,
    wherein the entity identifier is assigned to the third-party entity and conforms to a native format used by processing logic of the computing system,
    wherein the entity identifier is based on the account identifier scheme that is used by the third-party entity,
    wherein the resource provider identifier of the third-party entity identifies a name of a resource provider;
    verifying that the account identifier conforms to the account identifier scheme of the third-party entity; and
    executing the transaction using the entity identifier that conforms to the native format used by the processing logic of the computing system.

12. The computing system of claim 11, wherein the resource provider identifier of the third-party entity is an alphabet string and the entity identifier is a numeric string.

13. The computing system of claim 11, wherein the resource provider identifier includes a different number of characters than the entity identifier.

14. The computing system of claim 11, wherein the operations further include retrieving transaction parameters associated with the entity identifier, and verifying that the transaction being requested is within the transaction parameters associated with the entity identifier.

15. A method for conducting a transaction with a non-native account, the method comprising:
receiving a transaction request to execute the transaction, the transaction request including a resource provider identifier of a third-party entity, and an account identifier of an account of the third-party entity,
wherein the third-party entity is a mobile wallet service provider,
wherein an application programming interface (API) recognizes the account identifier of a payment account of the third-party entity based at least in part on a modifying of the API by inserting code into the API to parse parameters sent with an API call to determine a target account of the transaction and the third-party entity associated with the target account,
wherein the inserted code is configured to verify that account identifiers adhere to an account identifier scheme used by the third-party entity;
determining an entity identifier based on the resource provider identifier of the third-party entity,
wherein the entity identifier is assigned to the third-party entity and conforms to a native format used by processing logic of a transaction processor,
wherein the entity identifier is based on the account identifier scheme that is used by the third-party entity,
wherein the resource provider identifier of the third-party entity identifies a name of a resource provider;
verifying that the account identifier conforms to the account identifier scheme of the third-party entity; and
executing the transaction using the entity identifier that conforms to the native format used by the processing logic of the transaction processor.

16. The method of claim 15, wherein the resource provider identifier of the third-party entity is an alphabet string and the entity identifier is a numeric string.

17. The method of claim 15, wherein the resource provider identifier includes a different number of characters than the entity identifier.

18. The method of claim 15, further comprising:
retrieving transaction parameters associated with the entity identifier; and
verifying that the transaction being requested is within the transaction parameters associated with the entity identifier.

19. The method of claim 18, wherein the transaction parameters includes a transaction velocity limit or a transaction amount limit.

20. The method according to claim 1, wherein the non-native account is a third-party account that is not established with the processing system.

* * * * *